May 28, 1940.     R. M. PARTINGTON     2,202,715
ELECTRIC CIRCUIT
Filed Aug. 24, 1939
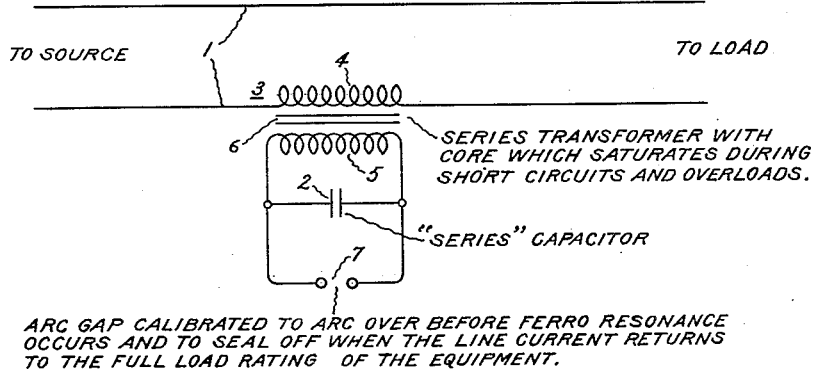
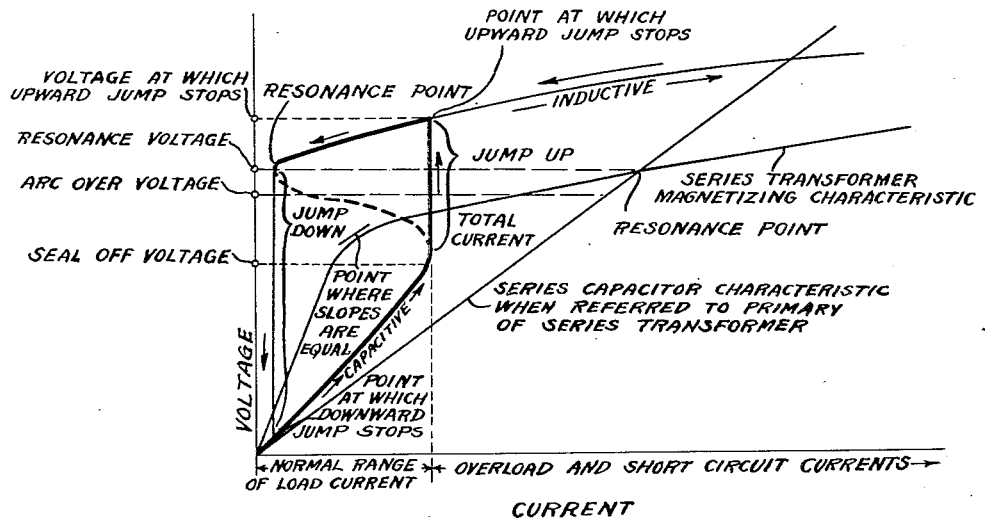
Inventor:
Robert M. Partington,
by Harry E. Dunham
His Attorney.

Patented May 28, 1940

2,202,715

UNITED STATES PATENT OFFICE 2,202,715

ELECTRIC CIRCUIT

Robert M. Partington, New Lebanon, N. Y., assignor to General Electric Company, a corporation of New York Application August 24, 1939, Serial No. 291,717

3 Claims. (Cl. 172—246)

This invention relates to electric circuits and more particularly to improvements in alternating current power distribution and transmission circuits containing a series capacitor connected therein by means of a series transformer.

The commercial distribution of electricity is today accomplished almost entirely by the so-called constant potential alternating current system. In this system changes in load cause corresponding changes in current and the potential of the system remains substantially constant. Practically all of the transmission and distribution circuits have an appreciable amount of distributed natural inductance which causes an objectionable voltage drop which is proportional to the magnitude of the current and which subtracts more and more directly from the system voltage as the power factor decreases in a lagging direction. A well-known way of neutralizing the inductance and thus eliminating this voltage drop is to connect a capacitor or electrical condenser in series in the circuit. The current rating of most distribution circuits is higher than capacitors can be economically manufactured to carry. Therefore, it has been proposed to connect the series capacitor in the distribution circuit by means of a series transformer which steps down the current rating and steps up the voltage rating so that the required amount of capacitive volt-amperes may be obtained from a relatively low-cost low-current high-voltage capacitor. Such an arrangement may be conveniently designated a series capacitor-transformer.

It has beeen found in practice, however, that a series capacitor-transformer often produces a curious and puzzling effect when the circuit is subjected to heavy overload or short circuit currents. This effect is characterized by an inversion of its reactance characteristics so that it acts like an inductance instead of a capacitance and thus accentuates rather than neutralizes the inductive voltage drop in the circuit. This in itself is not objectionable and in fact would be desirable if it only lasted during overcurrent conditions because the added inductive reactance effect would tend to limit the flow of overload or short circuit current. However, this condition persists until the circuit current falls to a very low value which is usually far below the normal current in the circuit and in fact is at the lower part of the normal current range.

This phenomenon is essentially the jumping phenomenon of ferro-resonance and may be explained as follows. As the circuit current increases due to an overload or a short circuit the core of the series transformer is operated at higher and higher flux densities. This eventually causes saturation of the core and causes the transformer to draw a higher and higher magnetizing current. By neglecting the losses in the series transformer and in the series capacitor the transformer primary current is equal to the difference between the transformer magnetizing current and the capacitor current because these two currents are in phase opposition with respect to each other. So long as the capacitor current when referred to the primary side of the transformer exceeds the transformer magnetizing current the net current can only increase when the capacitor current increases faster than the transformer magnetizing current but due to saturation of the core of the transformer a point is soon reached when the transformer magnetizing current increases faster than the capacitor current. The point where the change-over occurs is the point on the saturation curve of the core of the series transformer at which its slope is equal to the slope of the voltampere characteristic of the capacitor. Beyond this point as measured from the origin of the two characteristics the transformer magnetizing current increases faster than the capacitor current, thereby producing a decrease in the net current which obviously is an impossible condition in the main circuit in which an overload or a short circuit is actually causing the current to increase rapidly. Consequently, the voltampere characteristic of the combination of series transformer and capacitor jumps to a value on the other side of the resonance point. This value is one at which the net current is equal to the current at the point where the slope of the saturation curve is equal to the slope of the capacitor characteristic. However, as the resonance point has been passed the voltampere characteristic of the saturation curve of the iron core and the characteristic of the capacitor have crossed each other and the transformer magnetizing current now exceeds the capacitor current, thereby producing an inductive reactance effect. From this point on the net current will increase to a large value limited only by the system constants and system voltage. If now the main circuit current decreases it can fall to almost zero with the transformer magnetizing current still exceeding the capacitor current because when these two currents become equal the net current is zero and this point corresponds most closely to a resonance condition. Actually the current does not quite fall to zero because of the current necessary to supply the losses in the transformer and capacitor. As the total primary current in the transformer cannot fall below this loss current even when the transformer magnetizing current and the capacitor current exactly neutralize each other further decreases in current can only be produced by the voltampere characteristic of the combination of capacitor and reactor jumping to a point near the origin of the magnetizing and capacitor characteristics at which the voltage across the combination will be very much reduced, thus permitting a reduction in loss current and changing over the characteristics of the combination from inductive to capacitive.

I have discovered that the above described objectionable effect may be prevented from occurring by limiting the voltage rise across the series capacitor-transformer by means of a properly calibrated arc gap connected in parallel circuit relation with the series capacitor-transformer. That is to say, it may be connected across either the primary or secondary winding of the series transformer. The connection may be direct or indirect. An example of an indirect connection would be the interposition of an auxiliary transformer between the gap and the series capacitor-transformer.

An object of the invention is to provide a new and improved electric circuit.

Another object of the invention is to provide a novel and simple means for protecting a series capacitor-transformer from the occurrence of ferro-resonant phenomenon during short circuit and extreme overload conditions on the main circuit.

The invention will be better understood from the following description taken in connection with the acocmpanying drawing and its scope will be pointed out in the appended claims.

In the drawing Fig. 1 illustrates diagrammatically an embodiment of the invention and Fig. 2 is a diagram of the voltampere characteristics of Fig. 1 for explaining the operation thereof.

Referring now to Fig. 1, there is shown therein an alternating current power circuit 1 in which is connected a series capacitor 2 by means of a series transformer 3. As shown, the primary winding 4 of the transformer is connected directly in the circuit 1 and the secondary winding 5 is connected to the terminals of the capacitor. The core 6 of the transformer becomes magnetically saturated during short circuits and extreme overloads on the main circuit.

One way to connect an arc gap so as to prevent the occurrence of the previously described ferro-resonant phenomenon is directly across the capacitor, as shown by gap 7 in the drawing. This arc gap may have carbon electrodes or chromium-plated spherically-shaped copper electrodes, or it may be specially constructed so as automatically to transfer the arc from a pair of accurately spaced points to another pair of spaced points across which the arc may be maintained indefinitely without adversely affecting the calibration of the gap between the first pair of points. However, it is so constructed and calibrated that it arcs over at a capacitor voltage which is below the resonant voltage above which the capacitor voltage usually jumps when the ferro-resonant phenomenon occurs. That is to say, as soon as the core 6 saturates to such a point that the transformer magnetizing current for a given voltage across the transformer increases at a faster rate with rising voltage and current than does the current through the capacitor the voltage across the series transformer abruptly jumps to a relatively high value and the arc gap is calibrated to arc over at a voltage which is lower than the voltage at the resonance point, which in turn is lower than the maximum value to which the voltage usually jumps. I have discovered that the relatively large jump in voltage caused by the ferro-resonant phenomenon makes it possible to have the same arc gap seal-off at a voltage corresponding to the full load current rating of the circuit and still arc over at a voltage below the maximum value to which the voltage jumps when the ferro-resonant phenomenon commences.

This operation of the circuit and gap is clearly illustrated in Fig. 2 in terms of the voltampere characteristics of the capacitor 2, the transformer 3 and the resultant characteristic of the capacitor-transformer as a unit.

With such a gap it is impossible for the reactance characteristic of the transformer and capacitor to become inverted because the arc gap prevents the voltage from rising to a value high enough to permit operation in the inverted zone. Consequently, during a short circuit condition the capacitor and transformer are protected against over-voltages and a substantial part of the short circuit current (less than the line current by the transformer ratio) is by-passed through the gap. The current handled by the protective equipment is small compared to the short circuit current of the line by reason of the transformer ratio.

As soon as the line current falls to a safe value corresponding substantially to the full load rating of the equipment the automatic sealing-off of the arc gap restores the capacitor transformer to normal operation.

If for any reason the gap current is larger or of longer duration than can properly be carried by a gap a suitable electromagnetically operated contactor of the type used in conventional series capacitor protective arrangements can be provided for short circuiting the series capacitor-transformer.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In an alternating current power distribution system of the substantially constant potential type, in combination, a variably loaded circuit which has occasional overloads and short circuits and which has an appreciable amount of series inductance, a capacitor for normally neutralizing said inductance, a series transformer having a primary winding connected in said circuit and having a secondary winding connected across said capacitor so as to form a series capacitor-transformer, the overload and short circuit current values in said circuit being so great that they cause magnetic saturation of said transformer thereby producing a ferro-resonant phenomenon which causes a resultant inductive voltage drop across said primary winding which normally persists until the circuit current is reduced to a relatively low value in its normal range, and means for preventing the occurrence of said phenomenon comprising an arc gap connected in parallel circuit relation to said series capacitor-transformer, said arc gap being calibrated and constructed to arc over at a voltage lower than the voltage occurring at the resonance point.

2. The combination as defined in claim 1 in which the arc gap seals-off at a voltage corresponding to a value of current in the circuit which is substantially equal to the circuit's full load rating.

3. In an alternating current power distribution system of the substantially constant potential type, in combination, a variably loaded circuit which has a range of normal loads and occasional overloads and short circuits and which has an appreciable amount of series inductive reactance, a series capacitor-transformer connected in series in said circuit for neutralizing at least a part of said inductive reactance, said capacitor-transformer having a voltampere characteristic such that it acts like a series capacitor as the circuit current increases up to a predetermined relatively high value at which its voltage abruptly increases and above which it acts like a series inductance of substantially higher ohmic value than the series capacitor, said characteristic being such that as the circuit current decreases the capacitor-transformer continues to act like said inductance until the circuit current reaches a relatively low value at which the voltage abruptly decreases to a relatively low value and below which the capacitor-transformer again acts like said capacitor, said value of circuit current at which said voltage abruptly increases being at the lower end of the range of overload and short circuit currents, the maximum voltage in the range through which the voltage abruptly decreases being greater than the minimum voltage in the range through which the voltage abruptly increases, and means for preventing said capacitor-transformer from acting like an inductance at any value of circuit current comprising an arc gap connected in parallel circuit relation to said capacitor-transformer, said arc gap being calibrated to arc over at a voltage which is between the maximum voltage in the range through which the voltage abruptly decreases and the minimum voltage in the range through which the voltage abruptly increases, said arc gap being constructed to seal-off at a voltage below the minimum voltage in the range through which the voltage abruptly increases.

ROBERT M. PARTINGTON.